(12) United States Patent
Pal et al.

(10) Patent No.: US 12,551,103 B2
(45) Date of Patent: Feb. 17, 2026

(54) ANNULAR LIGHT SOURCE DEVICE FOR NEONATAL FUNDUS CAMERA

(71) Applicant: Forus Health Pvt. Ltd., Bangalore (IN)

(72) Inventors: Sourav Pal, Bangalore (IN); Justin Antony, Bangalore (IN)

(73) Assignee: FORUS HEALTH PVT. LTD., Bangalore (IN)

( * ) Notice: Subject to any disclaimer, the term of this patent is extended or adjusted under 35 U.S.C. 154(b) by 334 days.

(21) Appl. No.: 18/268,202

(22) PCT Filed: Dec. 14, 2021

(86) PCT No.: PCT/IN2021/051168
§ 371 (c)(1),
(2) Date: Jun. 16, 2023

(87) PCT Pub. No.: WO2022/130404
PCT Pub. Date: Jun. 23, 2022

(65) Prior Publication Data
US 2024/0115131 A1    Apr. 11, 2024

(30) Foreign Application Priority Data
Dec. 18, 2020  (IN) .............................. 202041055180

(51) Int. Cl.
*A61B 3/125*    (2006.01)
*F21V 8/00*    (2006.01)

(52) U.S. Cl.
CPC ............ *A61B 3/125* (2013.01); *G02B 6/0021* (2013.01); *G02B 6/0068* (2013.01); *G02B 6/0073* (2013.01)

(58) Field of Classification Search
CPC ... G02B 6/0021; G02B 6/0068; G02B 6/0073
USPC .................................................. 351/219, 246
See application file for complete search history.

(56) References Cited

U.S. PATENT DOCUMENTS

| | | | |
|---|---|---|---|
| 4,767,172 A | 8/1988 | Nichols et al. | |
| 8,974,060 B2 | 3/2015 | Plaian | |
| 2004/0066489 A1* | 4/2004 | Benedikt ................ | A61B 3/107 351/212 |

(Continued)

FOREIGN PATENT DOCUMENTS

| | | |
|---|---|---|
| CN | 209966345 U | 1/2020 |
| FR | 2768525 | 9/1999 |
| IN | 202041009258 | 9/2021 |

(Continued)

*Primary Examiner* — James R Greece
(74) *Attorney, Agent, or Firm* — The Belles Group. P.C.

(57) ABSTRACT

Disclosed is a method for defining a structure of an annular light guide device, for a fundus camera. An initial cross section of a wall of a light guide device is created in predefined way. A hollow cavity for a light source is defined within this cross section. The surface of the hollow cavity is an ellipsoid. Using a ray tracing software tool, the initial cross section is refined to maximise total internal reflection of the light from the source within the cross section to achieve most efficient light guide device. Once the final cross section is created, it is rotated by 360 degrees on a predefined axis to obtain final structure of the light guide device. The method is developed for creating very small light guide as required in a fundus camera especially for neonatal applications.

4 Claims, 14 Drawing Sheets

(56) References Cited

U.S. PATENT DOCUMENTS

2010/0091244 A1* 4/2010 Volk ................. A61B 3/117
                                                 351/219
2012/0050683 A1   3/2012 Yates

FOREIGN PATENT DOCUMENTS

TW        202107166       2/2021
WO    WO-2012054877 A2 *  4/2012  ............ F21V 7/0033

* cited by examiner

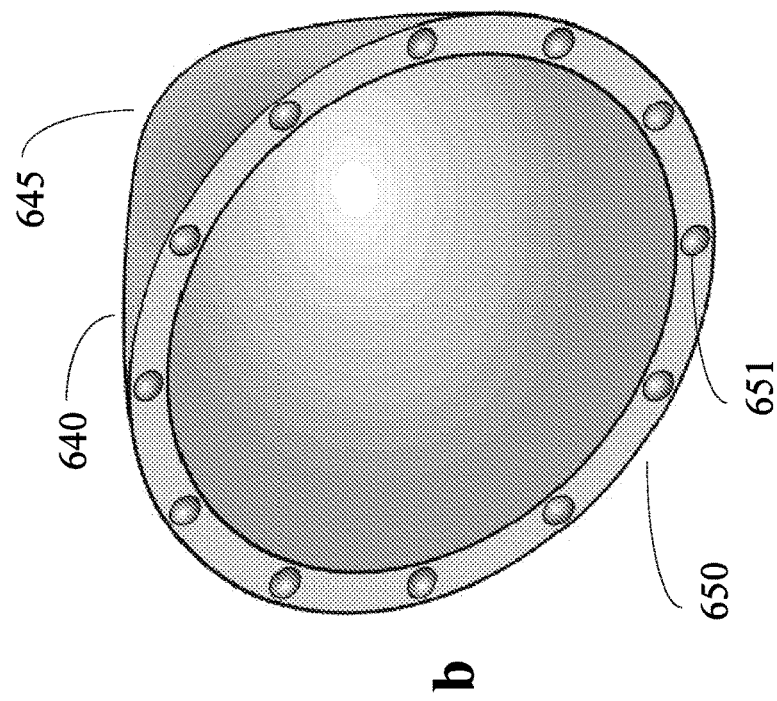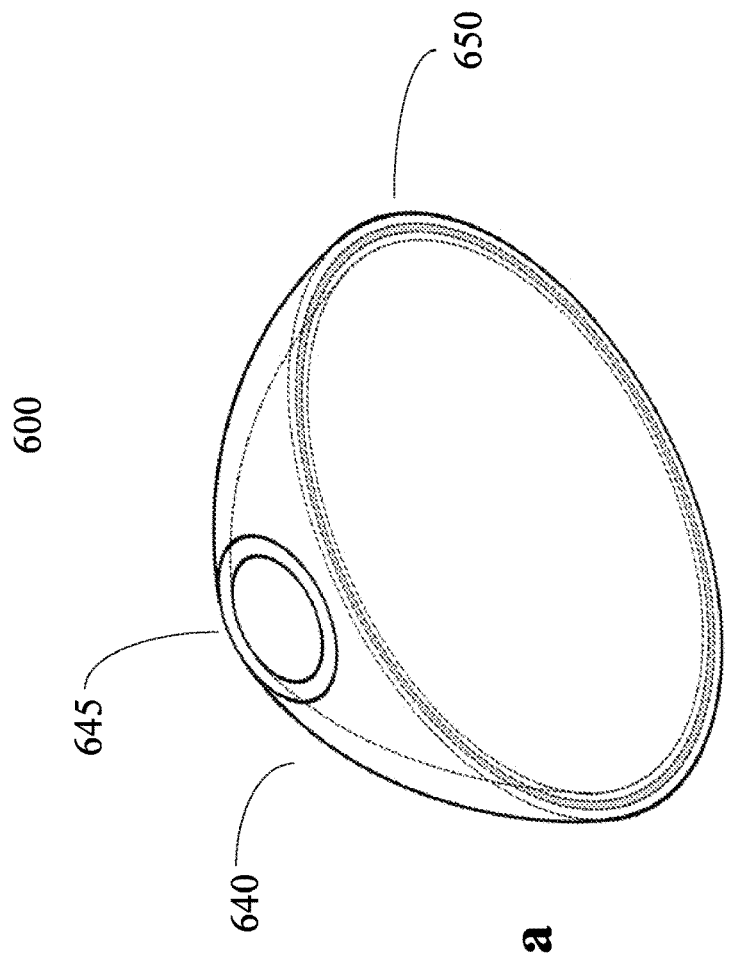
Figure 6

ANNULAR LIGHT SOURCE DEVICE FOR NEONATAL FUNDUS CAMERA

CROSS-REFERENCE TO RELATED PATENT APPLICATIONS

The present application is a U.S. national stage application under 35 U.S.C. § 371 of PCT/IN2021/051168, filed Dec. 14, 2021, which claims priority to Indian Patent Application number 202041055180 filed on Dec. 18, 2020. The disclosures of the aforementioned priority applications are incorporated herein by reference.

FIELD OF DISCLOSURE

This disclosure belongs to the field of medical ophthalmic apparatus and methods and in particular, to the field of annular light sources for neonatal applications.

BACKGROUND

Most of the optical imaging systems in the healthcare field comprise an illumination system. Many devices such as otoscopes, ophthalmoscopes, and endoscopes work in close proximity to the subject. This imposes a restriction in placement of the light source for the illumination beam. It is a common practice to carry light through guiding optics from a source situated at a location distal from the subject for illuminating and observing the organs of a subject.

Some devices use optical fibres to convey light from the source to the subject. Some devices use waveguides adapted for the purpose to illuminate the organs of the subject.

In general, illumination systems using optical fibres use a high-power light source, such as an arc lamp. Light from the source is coupled to the input end of a bundle of optical fibres either directly or using a condensing lens to improve coupling efficiency. The devices using waveguides use light emitting diodes (LED) as the light source and are energy efficient and compact in size. Because of their compactness and low power requirements, LED based systems with a light guide are replacing optic fibre based systems.

Prior art literature describing illumination systems using waveguides and LEDs disclose a few methods for improving the coupling of the light from the LEDs and waveguide. Without such measures, coupling loss increases and hence require a larger number of LEDs to obtain a given amount light output. This reduces the energy efficiency and may make the design of the equipment complex and heavier than otherwise. Also, the heat dissipated by the LEDs may need special attention.

The U.S. Pat. No. US4776771772, assigned to Xerox Corporation, describes a hemispherical cavity of a light guide in which an LED is located such that the light rays emanating from the LED enters the light guide with a very small angle of incidence, if not zero. This reduces or avoids the Fresnel reflection at the point of incidence thereby increasing the coupling efficiency.

Similarly, the French patent numbered FR27768525, assigned to Robert Bosch GmbH discloses the contour of the coupling surface as spherical concave shape.

The U.S. Pat. No. 89,774,060B2 discloses lighting device comprising a light concentrator device operatively associated with a light source comprising a plurality of LED devices. The light concentrator device is composed of a solid transparent body comprising: a first surface, at which a light input section is defined to receive the light radiation emitted by the light source. A second surface at which a light output section is defined to transmit a light beam having a ring shape. A plurality of protrusions that protrude from said first surface, at said light input section, said protrusions acting as collimation lenses of the light radiation coming from said light source. A plurality of reflection surfaces of the light radiation received from said light input section are provided. The said protrusions and said reflection surfaces being mutually positioned so as to convey the light radiation coming from said light source along a predefined path, which extends internally to said transparent body between said light input section and said light output section.

This patent '060 teaches away from the two patent documents cited above, namely, '1772 and '525. It discloses protrusions acting as collimating lenses instead of the hollow cavity disclosed by documents '1772 and '525. An analysis of the direction of radiations from the LED light sources and the angle of incidence of the radiation on the protrusions may reveal that the coupling is inefficient. Further, the shape of the light guide also offers multiple opportunities for the light entering it to escape from the surface of the light guide.

Further, in case of neonatal fundus imaging, the overall size of the annular light source must be comparatively small because the source comes into contact with the iris of the subject. This also means that the number of LEDs used must be as small as possible without compromising on the brightness. The smaller size also imposes a restriction on the heat dissipation from the LEDs and hence use of a small number of LEDs is preferred.

The prior patent documents do not disclose maximising the efficiency of coupling of light from LEDs to the light-guides.

SUMMARY OF DISCLOSURE

Thus, there is a need for a device and a method that can overcome at least one of the drawbacks mentioned above in the presently known annular light sources and methods and methods of achieving such an annular light source. Thus, the primary object of the disclosed annular light source device is to provide an annular light source device that can produce an annular illumination of required brightness wherein the coupling losses are minimized. It has to be noted that the term annular light source device refers to a light guide for producing an annular light beam and in this disclosure the two terms may be used interchangeably.

Further, it is an object of the present disclosure to provide an annular light source device that also minimizes the loss of light during its transmission from the input end to an output end. It has to be noted here that in light guides, the light is conveyed from the input end to output end through the phenomenon of Total Internal Reflection (TIR). However, depending on the angle at which a light ray impinges on the inner surface of the walls of the lightguide, there might be a loss of light through leakage and that means that all the light may not be reflected inward.

The light guide may be described as of an inverted cup shaped structure, with a wall of predefined cross section. It is made of a clear, transparent, colourless material such as polycarbonate. The top portion of the inverted cup has a circular hole and the plane of the rim of the hole is parallel to the rim of the cup. The rim of the cup has hollow cavities for accommodating LEDs. Alternatively, the space for accommodating the LEDs may be a channel, having a predefined cross section, within the wall of the inverted cup. The light from LEDs enter the inverted cup shaped light guide first encountering the surface of the hollow cavities or the channel. The contour of the surface of the hollow cavities are such that the angle of incidence for each ray emanating from the LED is negligibly small or zero. This ensures that negligibly small amount of the light is reflected and hence, the efficiency of light coupling is extremely high.

Further, the cross section of the wall of the inverted cup is such that during the process of total internal reflection the reflection from the outer and inner surfaces of the wall of the inverted cup is maximised and the light escaping the wall without internal reflection is reduced to be negligibly small value or zero.

With these two measures, the light guide is rendered highly efficient such that all the light emitted by the LEDs is collected, with negligible or no losses because of Fresnel reflection at the input end. Also, all the light is transmitted, with negligible or losses to the output end of the light guide.

In summary, disclosed is a method for defining a structure of such a light guide device. The method for defining a structure of a light guide for generating an annular light source, wherein the method comprises the following steps: (a) obtaining an initial cross section of a wall of a light guide, (b) a step of rotating the obtained cross section around a predefined axis for obtaining an inverted cup shaped structure; (c) a step of providing a predetermined number of hollow cavities for receiving light emitted by a predetermined number of LEDs (720); (d) a step (1493) of assessing the performance of the defined inverted cup shaped structure using a ray tracing software tool; (e) a step of checking if it at least meets predefined performance criteria; (f) a step of obtaining a modified cross section by modifying the initial cross section, for improved performance, when predetermined performance criteria are not met; and repeating the steps b to f, until a structure meeting or exceeding the predetermined performance is obtained.

The summary above is illustrative only and is not intended to be in any way limiting. Further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIG. 6 shows two perspective views, a and b, of the light guide for an annular light source device according to one embodiment of this disclosure;

Figure 1:
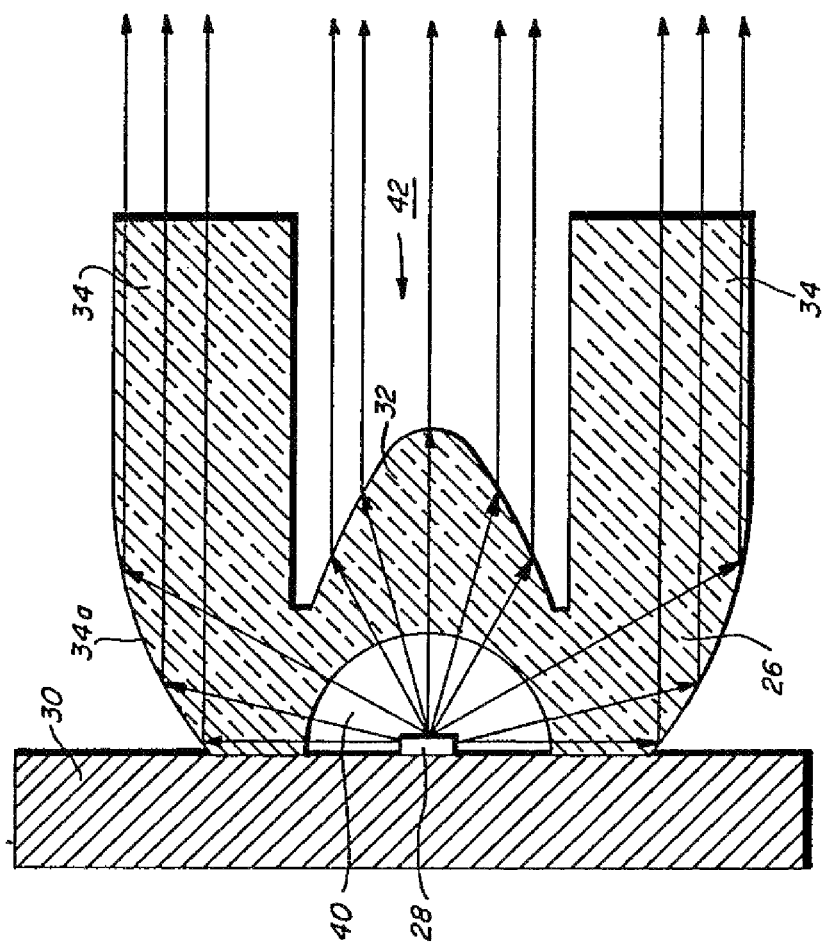
FIG. 1 shows a prior art light guide device.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION OF DISCLOSURE

For the purpose of promoting an understanding of the principles of the invention, reference will now be made to the embodiments illustrated in the FIGS. and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more apparatus or sub-systems or elements or structures or components proceeded by "comprises . . . a" does not, without more constraints, preclude the existence of other apparatus or other sub-systems or other elements or other structures or other components or additional device apparatus or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In some embodiments, the word 'patient', 'subject', and 'user' used in the description may reflect the same meaning and may be used interchangeably. The terms user, operator, optometrist, and ophthalmologist may also be used interchangeably and refers to a person who has taken up the task of testing the subject's vision.

In addition to the illustrative aspects, exemplary embodiments, and features described above, further aspects, exemplary embodiments of the present disclosure will become apparent by reference to the drawings and the following detailed description.

This is apparently based on the assumption that the light source is a point source, and it is located at the centre of the hemisphere of the cavity. However, there are no real point light sources and hence coupling is not perfect and there is bound to be losses in coupling due to Fresnel reflection.

Figure 2:
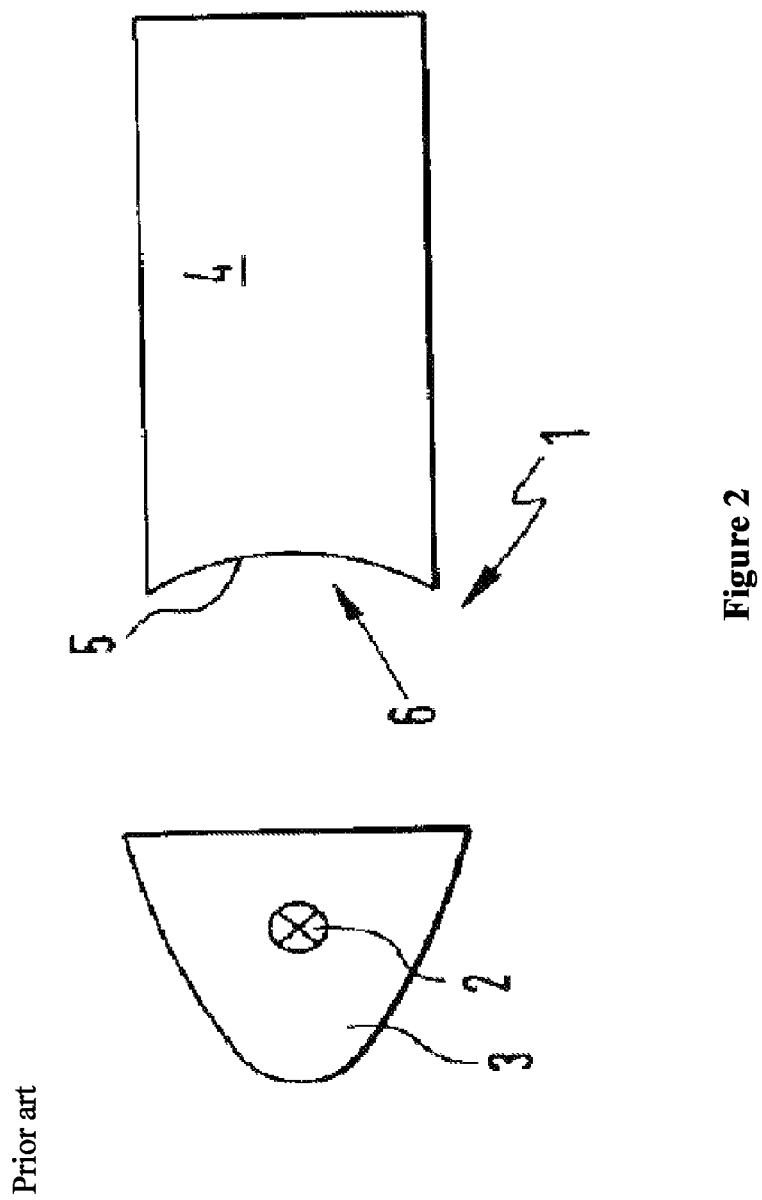
FIG. 2 shows another prior light guide device.

FIG. 2 shows a prior art light guide device and arrangement for coupling the light from the LED to the input end of light guide. The LED is located in an ellipsoidal reflector to produce a substantially parallel beam of light for coupling into the lightguide. But this arrangement is cumbersome, needs additional parts, such as the reflector. Further this arrangement also increases the size of the device because of the need for the distance between the LED and the input end of the light guide.

Figure 3:
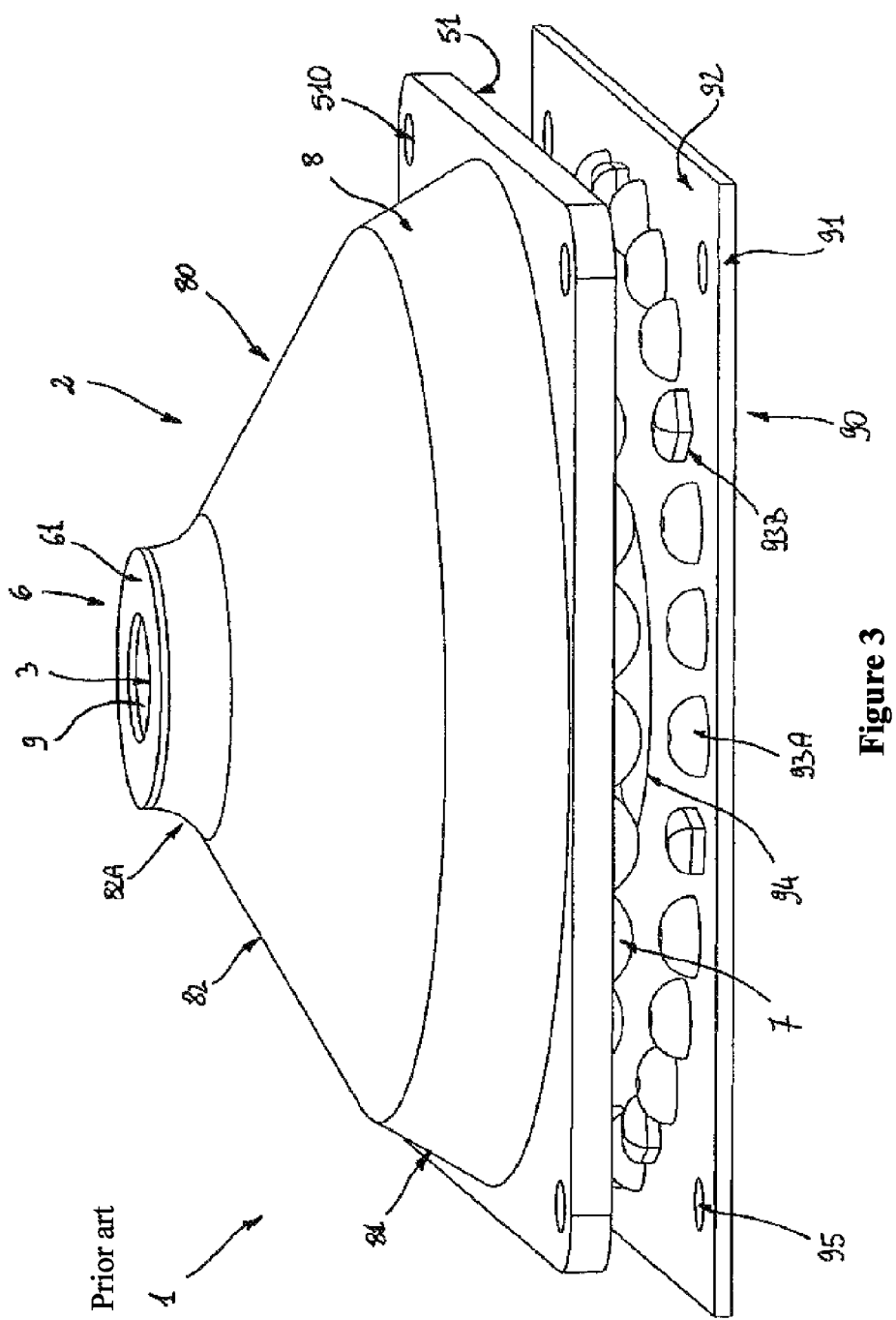
FIG. 3; shows yet another prior light guide device.

FIG. 3 shows a prior art light guide device with a plurality of protrusions that protrude from first surface at the input end of the light guide. These protrusions act as collimation lenses of the light radiation coming from said light source. However, the angle of incidence of the light from the LED as it enters the protrusions varies from 0° at the point nearest to the LED and substantially tangentially at the rim of the hemisphere in contact with the first surface, leading to a considerable loss of light due to Fresnel reflection.

Figure 4:
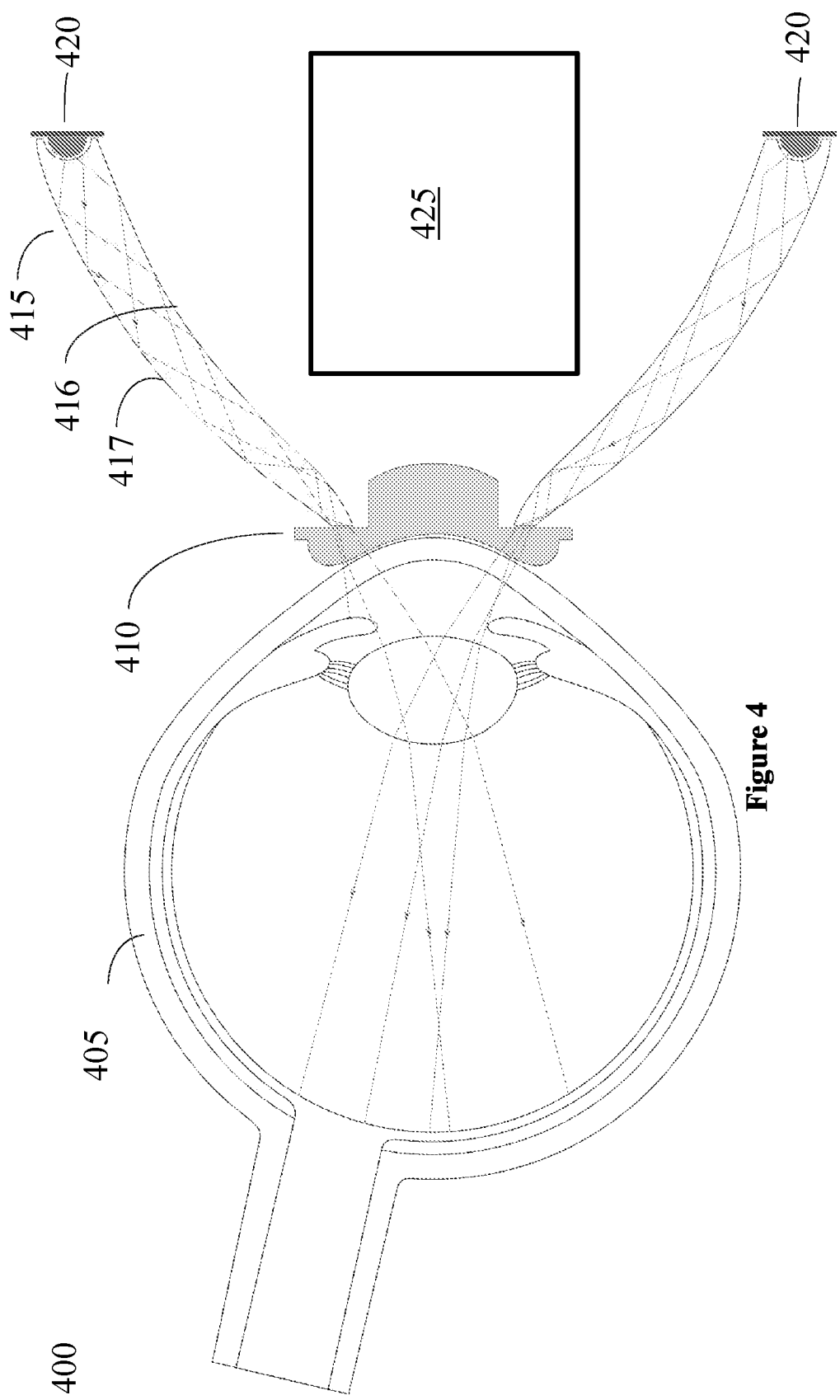
FIG. 4 is diagrammatic to view of a fundus camera.

FIG. 4 shows, diagrammatically, how fundus imaging is done. The fundus 405 of a subject is to be illuminated to be photographed. An annular light source comprising a light guide 415 and LED light sources 420 are also shown. Light rays from the LEDs 420 undergo total internal reflection inside the internal surface 416 and external surface 417 of the walls of the light guide 415. A contact lens 410 is used as an interface between the light guide 415 and the eyeball 405 of the subject. The light exiting the light guide 415 undergoes refraction by the contact lens 410 and substantially uniformly illuminates the fundus of the eyeball 405 of the subject. Optics 425, such as lenses, required by a camera is positioned within the light guide 415. Optics 425 focuses the image of the fundus for a camera (not shown) for capturing the image. This description is provided for an understanding of the fundus camera to enable the function and purpose of the exemplary light guide 415 according to one aspect of this disclosure.

Figure 5:
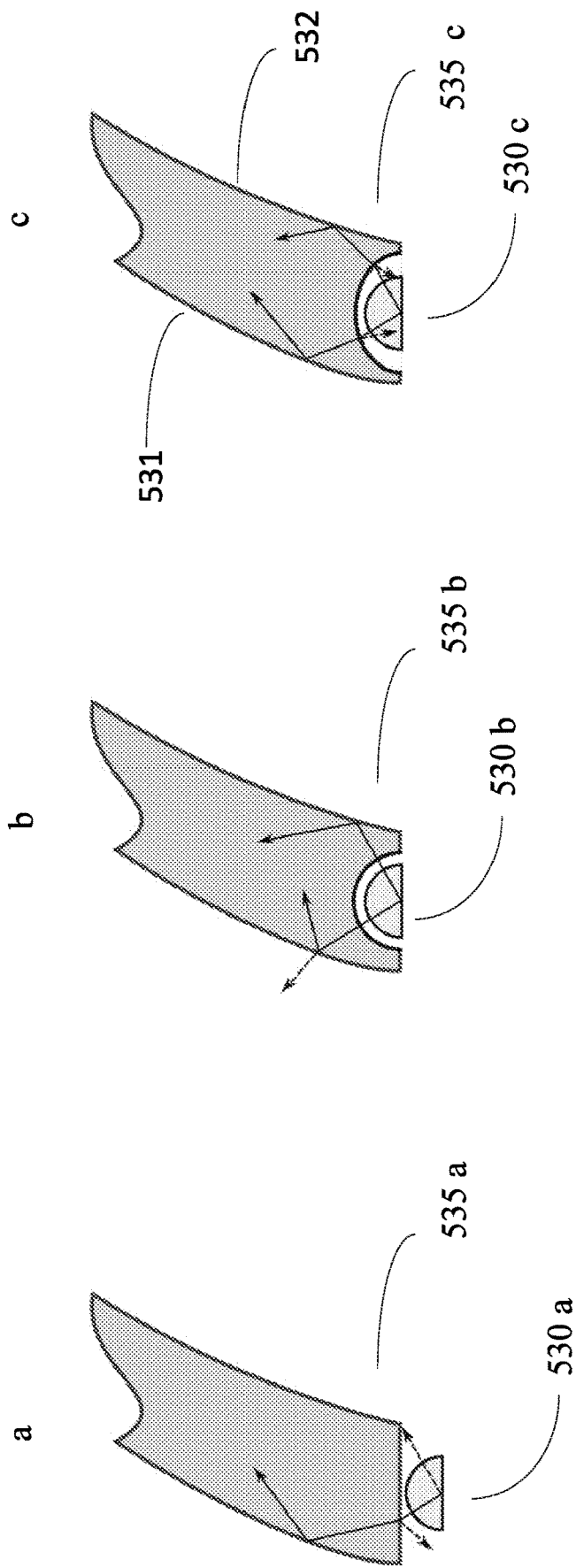
FIG. 5 shows three different arrangements for the coupling of the light from LEDs to the light guide wherein a and b are prior art arrangements and c is according to one embodiment of the present disclosure.
Figure 9:
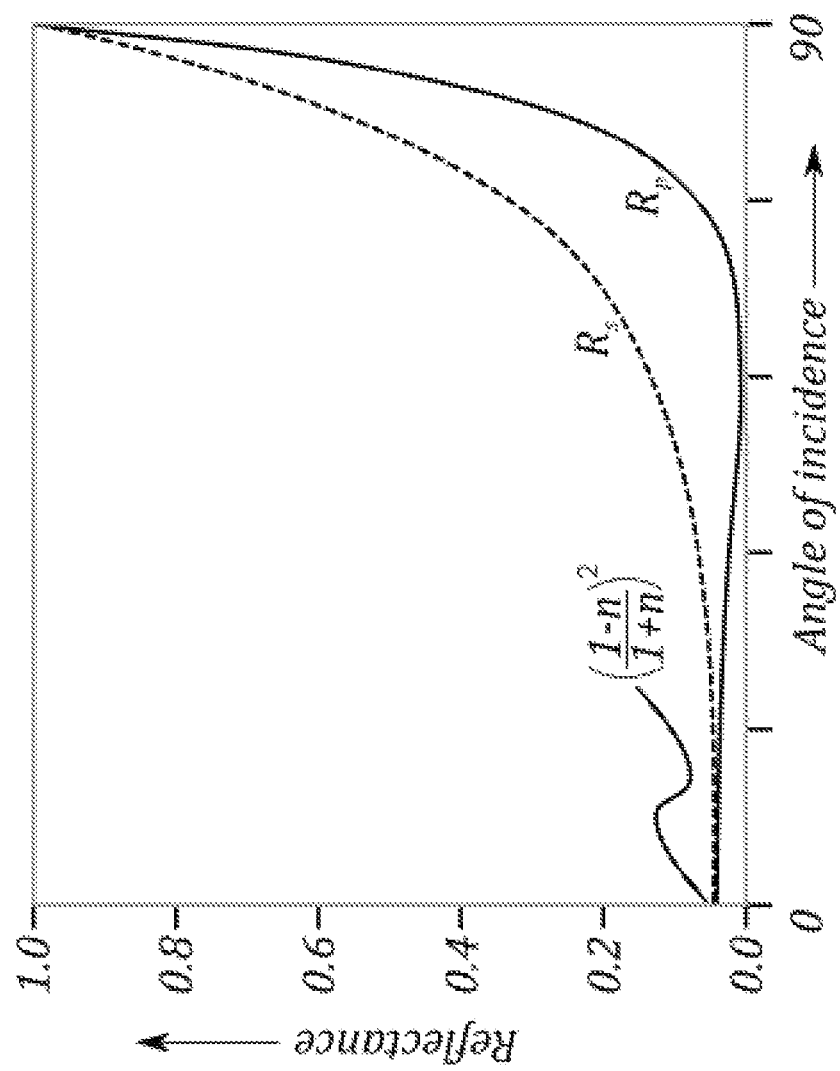
FIG. 9 graphically represents the reflectance as a function of the angle of incidence.

FIG. 5 depicts three arrangements a, b, and c, wherein the LED light sources are 530 *a*, 530 *b*, and 530 *c*, respectively. The light from these LED light sources are coupled through exemplary coupling arrangements of 535 *a*, 535 *b*, and 535 *c*. The coupling arrangement 535 *a* offers a planar surface to the incoming light from 530 *a*. The light that is coupled though the planar surface and is shown by solid lines. However, as described earlier, a part of the incoming light undergoes Fresnel reflection and is shown with a dotted line. The other dotted line shows a ray that does not encounter the planar surface and hence is lost. The coupling arrangement 535 *b*, offers a hemispherical concave surface to the incoming light from 530 *b*. In this arrangement, all the rays are coupled through an angle of incidence of substantially zero degrees. Hence all of these rays encounter minimal Fresnel reflection, which is $$\left(\frac{(n-1)}{(n+1)}\right)^2$$

as shown in FIG. 9. However, some of the light coupled may escape the lightguide as shown by a single dotted arrow in arrangement b.

Arrangement c shows a coupling arrangement modified according to one aspect of the present disclosure. The surface of the cavity may be defined by an ellipsoid. The Purpose of this shape change is explained considering two rays mentioned above. The rays propagating towards right gets refracted at the input surface before entering into the waveguide. It further gets totally internally reflected at the inner wall 532 of the light guide and propagates towards the other end of the waveguide. It experiences a Fresnel reflection at the dome surface and is lost. The Fresnel reflection in this case is higher than that in previous configuration shown in b. The ray propagating towards left gets refracted at the dome surface and hits the outer wall 531. Due to a bending at the dome surface, the ray hits the wall at a higher point than it would if the surface of the hollow cavity was that of a hemisphere. As a consequence, the angle of incidence increases, and the ray gets totally internally reflected substantially without any loss at the outer surface 531. It may be noted that this ray also encounters a loss due to Fresnel reflection at the surface of the dome. Introduction of ellipsoid ensures total internal reflection for both the rays at outer wall 531 and the inner wall 532 of the light guide even though it may increase the Fresnel reflection at the input surface compared to b.

FIG. 6 shows two perspective views, a and b, of an annular light source device according to two different embodiments of this disclosure. Part a of FIG. 6 shows a perspective view of the light guide modified for LED light sources having a cubical top. An annular groove with cubical profile is provided at the input end 650 of the light guide as shown by a pair of dotted lines. Part b of FIG. 6 shows a number of hollow cavities 651 at the input end of the light guide according to another embodiment of this disclosure. As described with reference to c of FIG. 5, the surface of these hollow cavities may be defined as ellipsoids, according to one aspect of the present disclosure.

Figure 7:
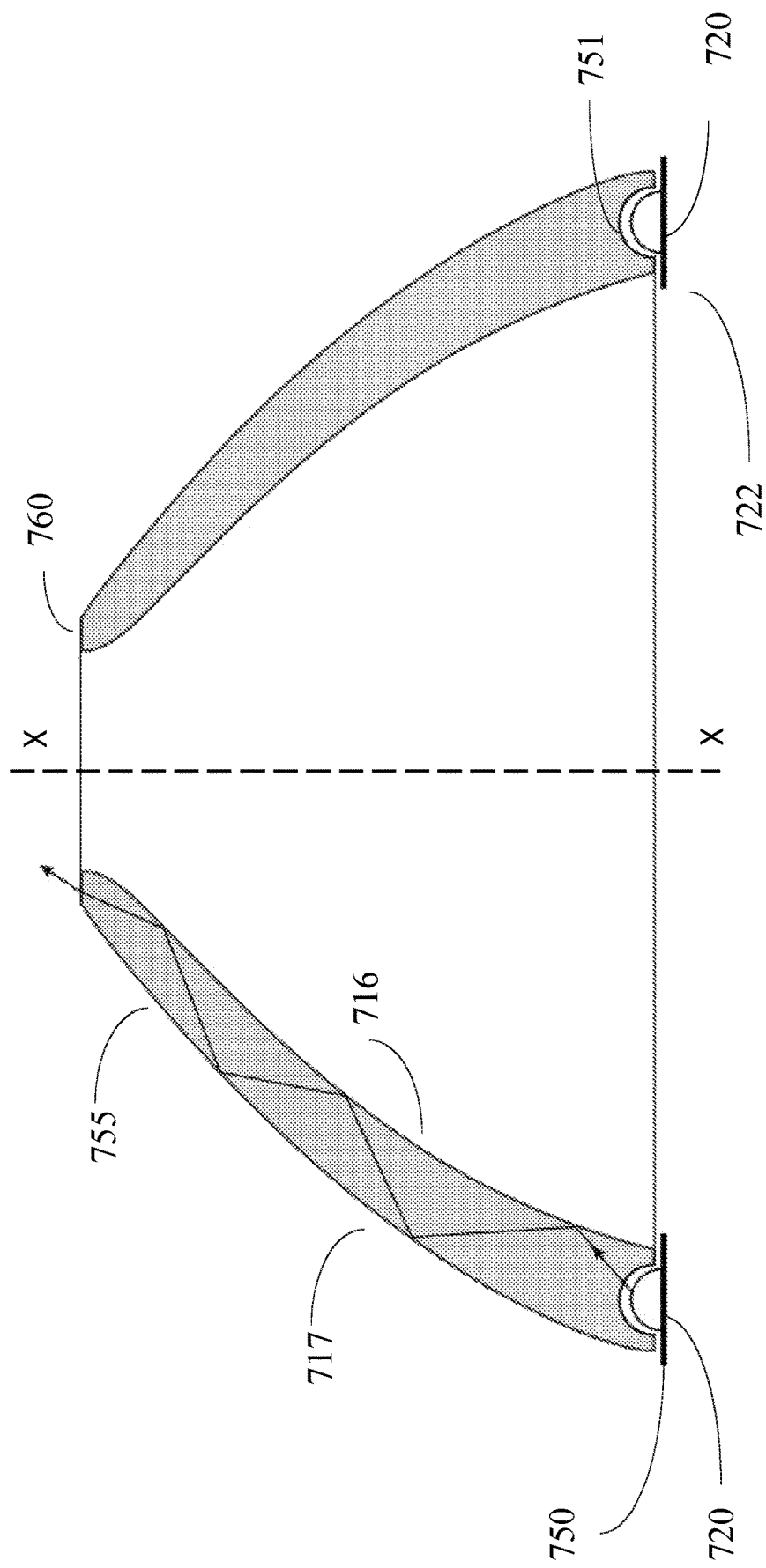
FIG. 7 shows a cross sectional view of a light guide according to one embodiment of the present disclosure.

FIG. 7 shows a cross-sectional view of one execution of mounting and installation of a light guide according to one aspect of the present disclosure. LEDs 720 are mounted on the printed circuit board (PCB) 722 wherein the term mounted carries the usual meaning in the field of electronics to mean that the LEDs are placed on designated places on the PCB 722 and soldered. The LEDs 722 may be devices with leads through holes or surface mount execution. The designated positions of LEDs form a circle and are so configured that they match the hollow cavities 751 along the receiving end 750 of the light guide 755 wherein the hollow cavities may be distributed uniform distances along the circle formed by the input end 750. Thus, the light emanating from LEDs 720 are coupled into the light guide 755 through the hollow cavities 751 and undergo total internal reflection at the internal surface 716 and external surface 717 of the wall of the light guide as indicated by a traced ray within the light guide 755 and exit at the exit end 760.

Similar arrangements are made for light guides executed for LEDs with cubical tops. The coupling arrangement was described earlier with reference to part a of FIG. 6. As in the case of the explanation with reference to FIG. 7, in this case also, the LEDs 720 are mounted on the PCB in designated places and form a circle. However, since the light guide executed for LEDs with cubical tops has a continuous groove of a square section, the placement and alignment of the light guide is much simpler since there are no individual hollow cavities for each LED to be aligned.

Figure 8:
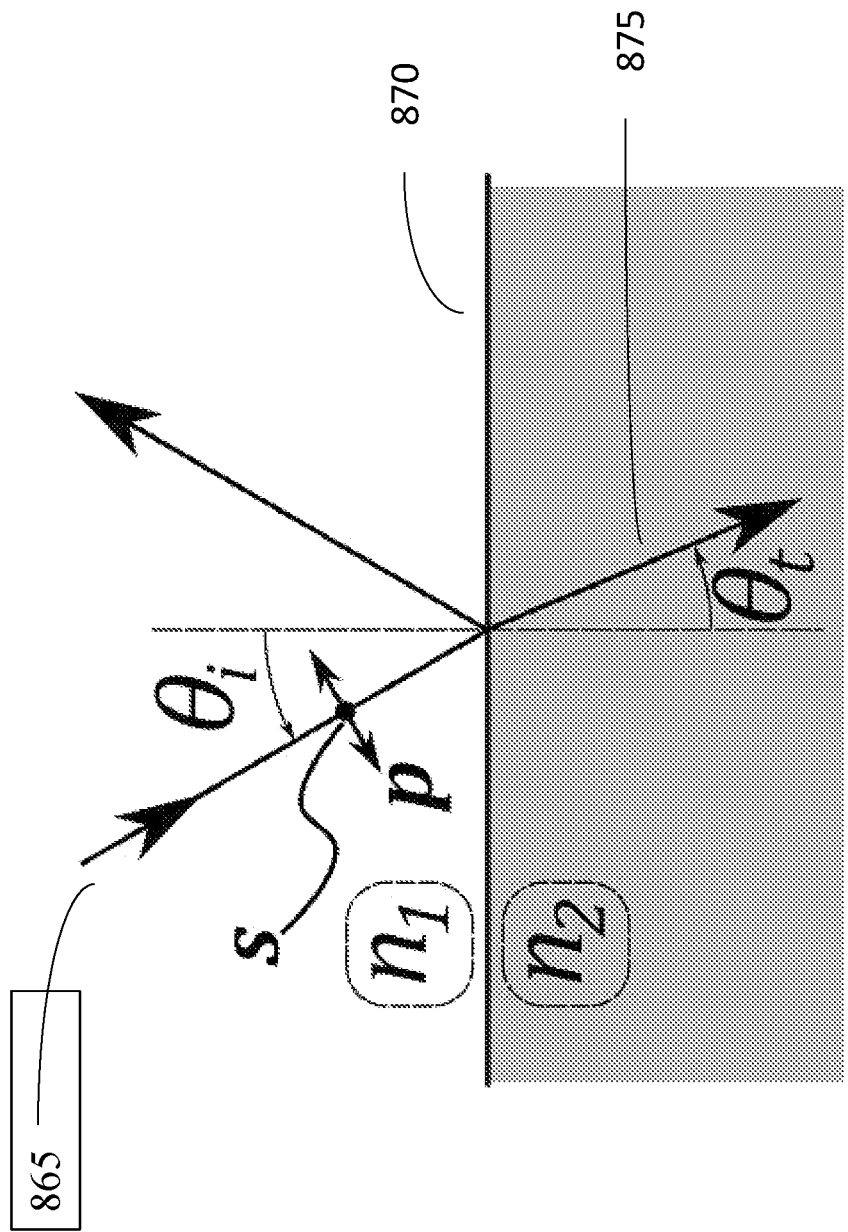
FIG. 8 shows the principle of refraction and the definition of certain terms.

FIG. 8 shows, diagrammatically, certain terms associated with refraction and reflection. n1 and n2 are two media with two different refractive indices. The dotted line is normal to the interface of the two media. An arbitrary ray 865 is getting refracted at the interface 870 of two media. The refracted ray is shown as 875. Angle of incidence $\theta_i$ and angle of refraction $\theta_t$ are measured from surface normal, which is the dotted line. As shown in FIG. 8, the p—polarization has an electric field on the plane of incidence (or the plane of paper or screen on which this figure is printed or displayed, in the present case). Conversely the s—polarization has an electric field perpendicular to the plane of incidence. It may be noted that, by nature of electromagnetic waves, both the electric field vectors are normal to the ray. In natural or un-polarized light, the aforementioned states of polarizations coexist equally. Therefore, effective reflectivity can be calculated by taking an average of reflectivity of two polarization states, which is given below.

$$R_{eff} = \frac{1}{2}(R_s + R_p)$$

The reflectivity $R_{eff}$ and the loss due to reflection increase with growing angle of incidence, which is presented in FIG. 9 graphically. The curve is plotted for reflectivity when a ray travels from air to a medium having refractive index of n.

It may be noted here that this ray encounters a loss due to Fresnel reflection. The magnitude of the loss is proportional to reflectivity of the material, which is explained in following expressions.

$$R_s = \left|\frac{n_1 \cos\theta_i - n_2 \cos\theta_t}{n_1 \cos\theta_i + n_2 \cos\theta_t}\right|^2$$

$$R_p = \left|\frac{n_1 \cos\theta_t - n_2 \cos\theta_i}{n_1 \cos\theta_t + n_2 \cos\theta_i}\right|^2$$

where, $R_s$ and $R_p$ are reflectivity for s—and p—polarized light respectively, $n_1$ and $n_2$ are refractive indices respectively, and finally $\theta_i$ and $\theta_t$ are angles of incidence and refraction respectively.

With this in background, the method of creating the structure of the light guide device according to one aspect of the present disclosure is described below with reference to FIGS. 10, 11, and 12. An initial cross section of a wall of a light guide is first created. Using this cross section as the initial cross section, the cross section is progressively modified to obtain the final cross section. This method is described below in detail.

Figure 10:
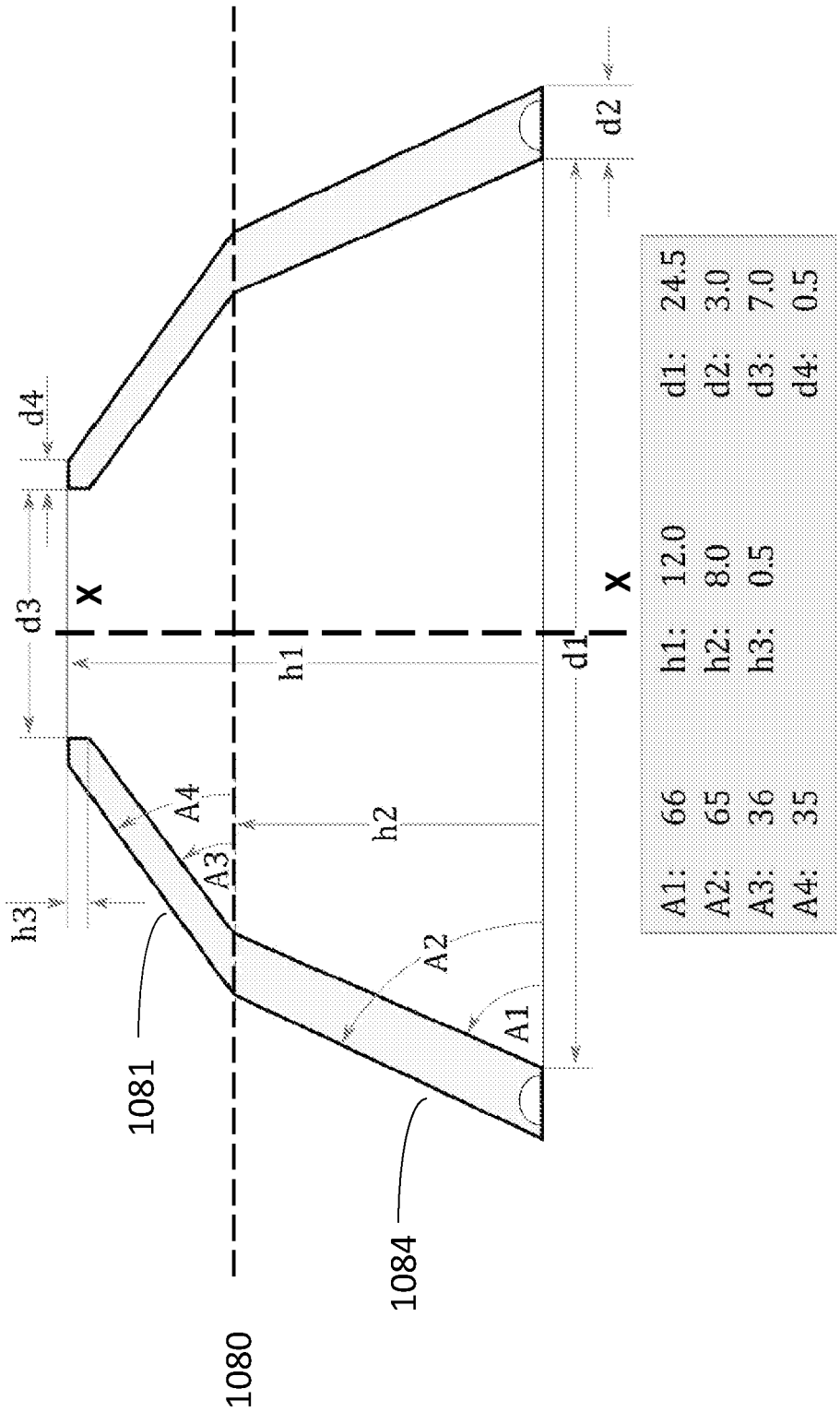
FIG. 10 shows an exemplary initial cross section of the wall of the light guide.

The cross section of an exemplary initial structure of the light guide is shown in FIG. 10. This cross section may be formed by two parts 1081 and 1084 wherein 1081 is above an imaginary line 1080 (shown as a dashed line) and 1084 is below the imaginary line 1080.

Figure 11:
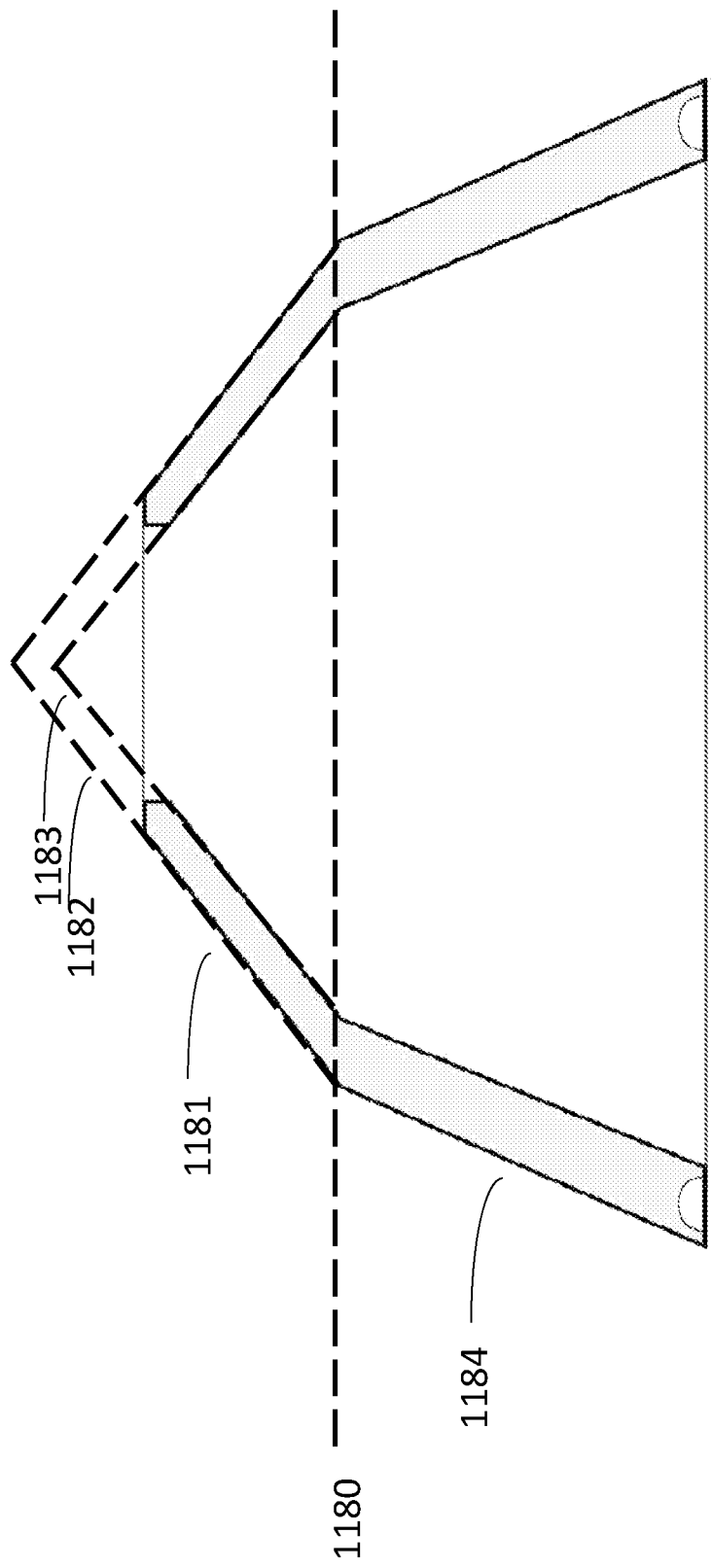
FIG. 11 shows a detail of defining the first part of the initial cross section.

The part 1081 above the imaginary line can be treated as a part of a truncated hollow cone shown in FIG. 11, in dashed lines 1182 and 1183 as extensions of the outer line and the inner lines, respectively.

Figure 12:
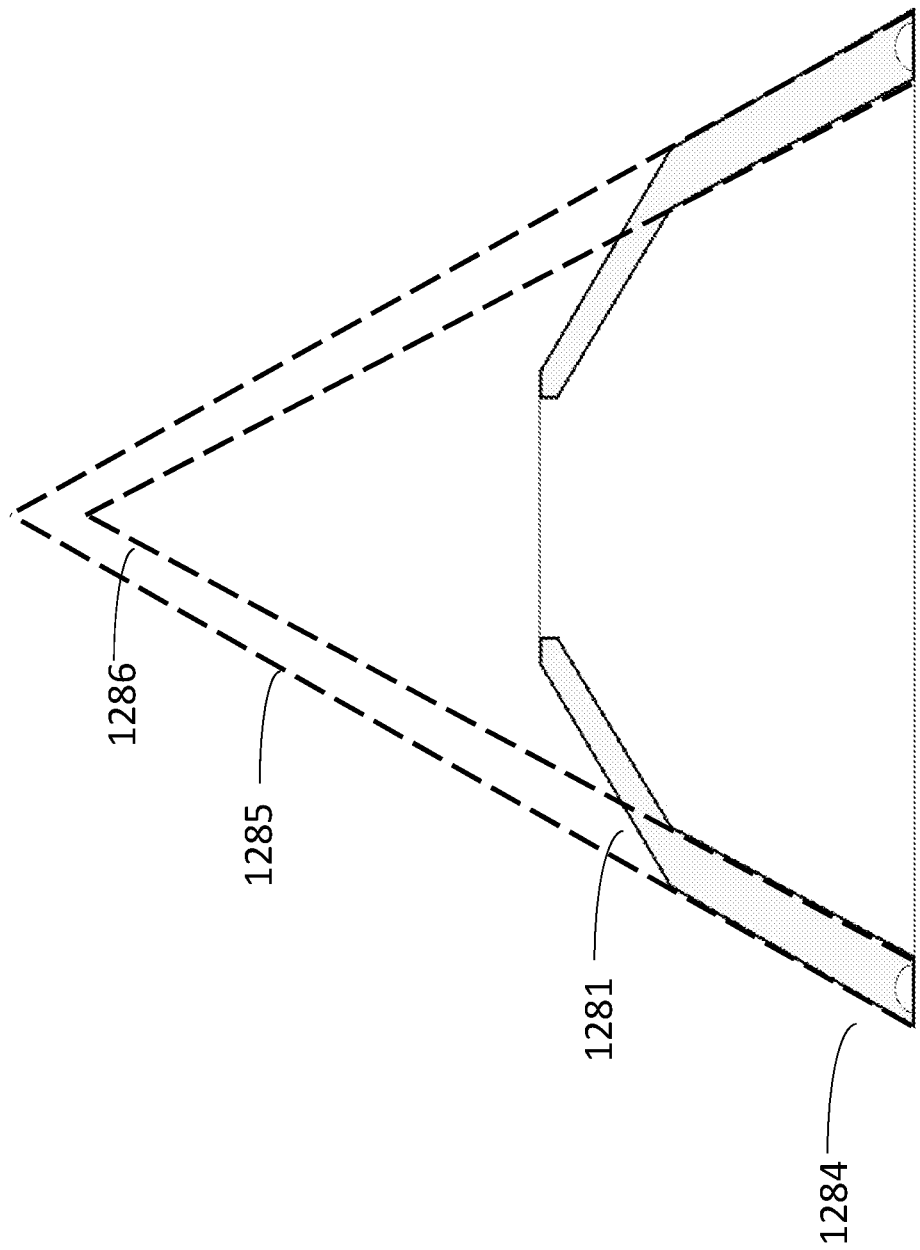
FIG. 12 shows a second detail of defining second part of the initial cross section.

Similarly, the part 1084 may be imagined to be a part of a truncated hollow cone shown in FIG. 12 in dashed lines 1285 and 1286 as extensions of the lines forming the part 1084 as extensions of the outer line and the inner lines, respectively.

Alternatively, a known cross section of a known annular light source device of similar structure may be used as an initial cross section. That is, once a structure has already been created starting from the initial cross section as described above, a need may arise for a different annular light source device with any one or more of its dimensions being different. In such a case the cross section of the known annular light source device may be used as the initial cross section to obtain a new structure, using the rest of the method disclosed hereinafter.

Figure 13:
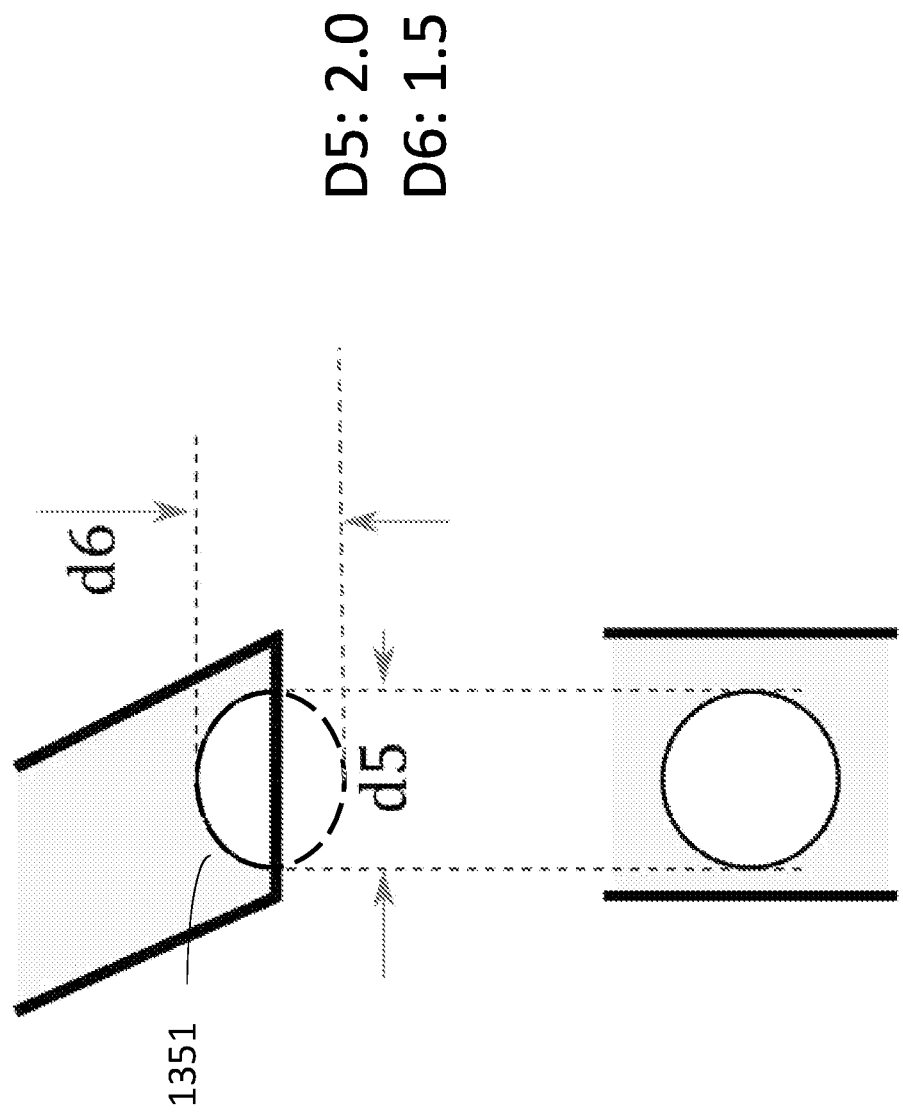
FIG. 13 shows one method of defining a hollow cavity for accommodating an LED.

Once the cross section as shown in FIG. 10 is obtained as an initial cross section of the wall of the light guide, it is rotated by 360 degrees around a predefined axis x-x to obtain an initial inverted cup shaped structure of the light guide. Then, the hollow cavity 1351 for the LED, as the light source for the device is defined as shown in FIG. 13. These hollow cavities 651 are spread uniformly on the rim of the cup 650 as shown in FIG. 6b, for example. The hollow cavity is dimensioned as an ellipse with a minor axis of 1.5 units and a major axis of 2 units as shown in FIG. 13, with the major axis being radial with respect to the axis x-x. And it can be imagined that the hollow cavity 751 is created by rotating the ellipse by 180 degrees around the minor axis. The actual dimensions of the minor and major axes may be decided based on the dimensions of the LED that is intended as the light source. Even though a ratio of 1.5 and 2 have been specified a slightly different pair of values depending on the requirements may be used by a person of ordinary skill in the art to suit a specific requirement.

Once this structure has been obtained, a ray tracing software is used to predict the performance of the inverted cup shaped light guide structure with an LED in each of the hollows cavities 651, 1351. Once the predicted results are obtained for the initial cross section, the results are checked to see if they meet predefined performance criteria. The cross section is modified towards increasing the total internal reflection and hence the light output of the light guide. The cross section may be modified at places where there is a large amount of losses such that the losses are minimised. Once the cross section is modified, the process, of rotating the cross section around the x-x axis, providing the hollow cavities for the light LEDs are repeated and the performance of the modified structure is assessed using the ray tracing software tool. The cross section is modified further towards increasing the total internal reflection and hence the light output of the light guide. This process is repeated a number of times to obtain a cross section that at least meets or exceeds predetermined performance criteria. The performance criteria may be a predetermined value of the total light output or a minimum value for light loss or both or so on.

Ray tracing software tools are many. For example, Zemax™ is a company that sells or licenses optical design software, OpticStudio™, which is its flagship product. Or for example, Fred Optical Engineering Software (FRED) is a commercial 3D CAD computer program for optical engineering used to simulate the propagation of light through optical systems. A person skilled in the art will be able to use a software tool such as this to optimize the cross section using any one of the many available software.

Once the final, optimized cross section 755 as shown in FIG. 7 is created, for instance, if the cross section so obtained is rotated around the axis x-x shown in dotted line, a structure for light guide 640 such as the one shown in FIG. 6b, for example, is obtained. It is to be understood that when the rotation around the x-x axis is carried out, the hollow cavity previously created is erased. Otherwise a hollow circular grove as shown in 6a will result but with an ellipse instead of a square profile. For the sake of brevity and clarity this step may not be expressly written always in this disclosure but must be assumed that it is carried out. However, the positions of the hollow cavities for the LEDs will be located individually at predetermined places. The number of LEDs and their locations may be determined by the brightness of the LEDs chosen and the brightness of the annular light required and so on.

Figure 14:
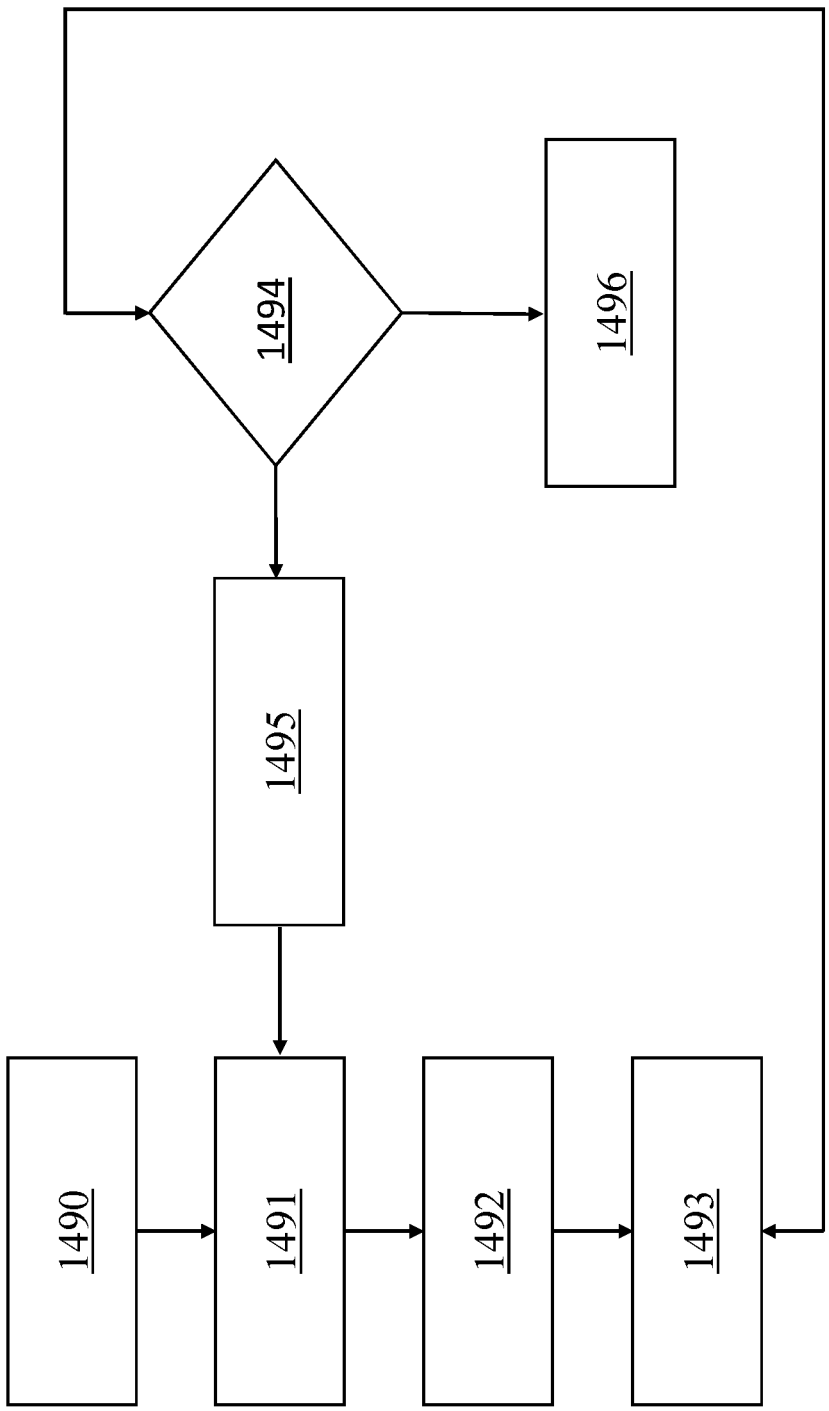
FIG. 14 shows the disclosed method in the form of a flow diagram.

Thus, a method for defining the structure of a light guide for generating annular light source device is disclosed. The method comprises the following steps. Referring to FIG. 14, at step 1490 an initial cross section 1181, 1184 for a wall of a light guide is defined. As can be readily seen, the cross section is referred to here with two reference numerals, it is the combination of the two that is a single composite cross section. At step 1491 the cross section obtained above is rotated around a predefined axis, which is also the axes of the two truncated hollow cones that are used to obtain the initial cross section above. Rotating the cross section yields a structure which may be described as an inverted cup. At step 1492 a predetermined number of hollow cavities 651, 751, 1351, for receiving the light emitted by an LED 720 in each of the hollow cavities, are provided in the initial inverted cup shaped structure as described before. The cross section of a hollow cavity has been described with reference to FIG. 13. At step 1493 the performance of the initial cross structure is assessed with the help of a ray tracing software tool, wherein the rays traced are from the plurality of LEDs provided in the hollow cavities 651, 751. At step 1494 the results of the assessment are compared with predetermined criteria for the performance of the light guide. If the performance does not meet or exceed the predetermined criteria the initial cross section is refined or modified, in step 1495, for obtaining a modified cross section, based on the results of the assessment. And the method reverts to step 1491 of rotating the modified cross section around the predefined axis x-x and the steps 1492 to 1494 are repeated. If, at step 1494, the performance of the structure meets or exceeds the predefined limits in step 1496, the structure is treated as the final acceptable structure.

The inventors have envisaged two variants of this method. In one variant the method is implemented with human interaction, for example, for executing the step 1495 for modifying the cross section. In another variant the method is implemented without human intervention wherein the method is implemented on computer configured for implementing the disclosed method, once the initial cross section of the wall of the inverted cup like structure is provided.

FIG. 10, however, shows the angles and dimensions of one implementation of the lightguide, according to one aspect of the present disclosure. A person skilled in the art will readily understand how to practice the disclosed method based on the preceding detailed description. They may start with different values and angles to suit their particular requirement. For example, a slightly different size of the optics 425 may require different dimensions d1, A1, and A2 than as shown in FIG. 10. All such variations selected by a person skilled in the art while practicing the teachings of this disclosure are under the scope of this disclosure.

Thus, disclosed is a light guide device for creating an annular light source device for neonatal fundus camera. The light guide is made out of a clear, transparent, colourless material such as polycarbonate by a production process such as injection moulding. The mould defines the shape of the light guide device. The shape is not defined mathematically but is obtained by the process disclosed by the present disclosure.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for defining a structure of a light guide for generating annular light source, wherein the method comprises:
   a. a step of obtaining an initial cross section of a wall of the light guide, wherein obtaining the initial cross section is by using cross sections of two truncated hollow cones;
   b. a step of rotating the obtained cross section around a predefined axis for obtaining an inverted cup shaped structure;
   c. a step of providing a predetermined number of hollow cavities for receiving light emitted by a predetermined number of LEDs;
   d. a step of assessing the performance of the defined inverted cup shaped structure using a ray tracing software tool;
   e. a step of checking if it at least meets predefined performance criteria;
   f. a step of obtaining a modified cross section by modifying the initial cross section, for improved performance, when predetermined performance criteria are not met; and repeating the steps b to f, until a structure meeting or exceeding the predetermined performance is obtained.

2. The method as claimed in claim 1, wherein obtaining the initial cross section is using a cross section of a known annular light source device.

3. The method as claimed in claim 1, wherein assessing the performance includes one or more of, assessing a light output of the structure, assessing a magnitude of light lost at surfaces of walls of the light guide.

4. The method as claimed in claim 1, wherein obtaining a modified cross section is by modifying the initial cross section for increasing an angle of incidence of a ray on one or more of an internal surface of the cross section and the external surface of the cross section.

* * * * *